(12) United States Patent
Kawano et al.

(10) Patent No.: US 6,397,332 B2
(45) Date of Patent: *May 28, 2002

(54) VERIFICATION DATA GENERATING APPARATUS, DATA VERIFICATION APPARATUS AND STORAGE MEDIUM FOR STORING VERIFICATION DATA GENERATING PROGRAM

(75) Inventors: Kenji Kawano; Masahiro Taguchi; Kazuo Saito, all of Nakai-machi (JP)

(73) Assignee: Fuji Xerox Co., Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/115,642

(22) Filed: Jul. 15, 1998

(30) Foreign Application Priority Data

Jul. 18, 1997 (JP) .............................. 9-193535

(51) Int. Cl.⁷ ................................ H04L 9/30
(52) U.S. Cl. ..................... 713/176; 713/179; 713/180; 380/30
(58) Field of Search ................................. 713/176, 179, 713/180; 380/30

(56) References Cited

U.S. PATENT DOCUMENTS

| | | | | |
|---|---|---|---|---|
| 4,309,569 A | * | 1/1982 | Merkle ...................... | 713/177 |
| 5,311,591 A | * | 5/1994 | Fischer ...................... | 713/156 |
| 5,373,561 A | * | 12/1994 | Haber et al. ................ | 713/157 |
| 5,432,852 A | * | 7/1995 | Leighton et al. .............. | 380/30 |
| 5,465,299 A | * | 11/1995 | Matsumoto et al. ......... | 713/176 |
| 5,712,914 A | * | 1/1998 | Aucsmith et al. ............. | 380/30 |
| 5,903,651 A | * | 5/1999 | Kocher ....................... | 713/158 |
| 5,995,623 A | * | 11/1999 | Kawano et al. .............. | 713/189 |
| 6,161,183 A | * | 12/2000 | Saito et al. .................. | 713/176 |

FOREIGN PATENT DOCUMENTS

| | | |
|---|---|---|
| JP | A-3-25605 | 2/1991 |
| JP | A-6-180762 | 6/1994 |
| JP | B2-6-95302 | 11/1994 |

OTHER PUBLICATIONS

E. Okamoto, "Encryption Theory Introduction", Kyoritsu Publishing company, 1193, pp. 134–138.
Haber et al, "How to Time–Stamp a Digital Document," Journal of Cryptology, vol. 3, No. 2, p. 99–111, Aug. 1991.*
Devanbu et al, "Stack and Queue INtegrity on Hostile Platforms," IEEE Proc. on Secrecy and Privacy, p. 198–206, 1998.*

* cited by examiner

Primary Examiner—Gilberto Barron, Jr.
Assistant Examiner—Steve Kabakoff
(74) Attorney, Agent, or Firm—Oliff & Berridge, PLC (57) ABSTRACT

A verification data generating apparatus generates data that can be stored in a terminal device without sustaining unauthorized operations and has assured continuity in the order of being output.

In the apparatus, a verification data holding element holds a verification data. A data generation element generates a data body at a predetermined timing. Whenever the data body is generated, a verification value generation element generates a new verification value based on the verification value held in the verification value holding element and the data body newly generated. The verification value held in the verification value holding element is then updated with the new verification value. A data storage element stores the data bodies generated by the data generating element in order. On receiving a verification data outputting request, a verification data outputting element generates a signature value based on the verification value held in the verification value holding element and outputs verification data generated by concatenating the signature value with the data body stored in the data storing element.

9 Claims, 12 Drawing Sheets

VERIFICATION DATA GENERATING APPARATUS, DATA VERIFICATION APPARATUS AND STORAGE MEDIUM FOR STORING VERIFICATION DATA GENERATING PROGRAM

BACKGROUND OF THE INVENTION

1. Field of the Invention

The present invention relates to a verification data generating apparatus, a data verification apparatus and a storage medium for storing a verification data generating program and in particular relates to a verification data generating program that provides a signature to a data group to generate verification data, a data verification apparatus that verifies the verification data with a signature and a storage medium for storing a verification data generating program to attach a signature to a data group.

2. Discussion of the Related Art

Recently, networks have developed and various kinds of information are digitized to be distributed through a network. The information such as the character information, still pictures, animations, sound information, programs can be digitized and we can obtain various services on the network that are combinations of those pieces of digital information. However, the digital information has a major defect that it is easily copied. A copy of a piece of digital information is completely the same as the original. Once the digital information is distributed through the network, there occurs a possibility that the information would be copied and used without authorization by the author. Therefore, the author can hardly receive a justifiable reward to which he/she deserves. Thus the easiness of copying has been a factor that prevents distribution of the digital information on the network.

To overcome the problem, systems such as "CD-Showcase" (Trademark of International Business Machines Corporation) have been offered, wherein digital information is encrypted to be freely distributed and used with a decryption key acquired through the telephone network at some charge. However, in this method it is impossible to impose a charge to a user according to the frequency of use.

To impose the charge to the user according to the frequency of use, it is necessary to collect charge imposing information such as a using history. The collection of the using history requires a system for assuring legitimacy of the using history because it is also a piece of digital information.

As disclosed by Japanese Patent Application Laid-Open No. Hei. 3-25605 "Charge imposing information transmission method" (1991) and Japanese Patent Application Laid-Open No. Hei. 6-180762 "Charge imposing information collection system" (1994), devices for outputting the charge imposing information are connected to the communication network to automatically collect the charge imposing information. If the communication network is utilized, the legitimacy of the charge imposing information can be assured by a digital signature method or the like using the RSA (Rivest, Shamir, Adleman) encryption (see "Encryption Theory Introduction", Eiji Okamoto, Kyoritsu Publishing company, 1993, pp. 134–138).

The above cases are suggested on the premise that a terminal device for using the digital information is always connected to a network. The premise is supposed because of the bad effects such as the tampering with the data by the user or system troubles caused by the storage of the data in the off-line terminal devices for a long time. However, in general, most of the users utilize the digital information off-line. Therefore it is hardly acceptable to constantly control the user's terminal device through the network considering the communication costs or operability of the system.

An Integrated Circuit (IC) card attracts attentions as a medium for storing secret information. The charge imposing information or the like can be securely collected by the IC card. Japanese Patent Publication No. Hei. 6-95302 (1994) discloses "Software administration method" applied to a system that imposes a charge for using software according to an amount of using and collects the charge by utilizing the IC card. More specifically, a user buys an IC card at a predetermined agency. The price is then written in a balance memory of the card. When the user activates the software, the balance memory of the IC card is checked and the amount corresponding to the charge for using the software is subtracted from the balance memory. When the user spends the whole amount of money written in the balance memory of the card, the card is forwarded to a Software Service Association (hereinafter, referred to as SS association). Particulars of use of the software is stored in the IC card. The SS association pays the charge for using to the author of the software based on the particulars. Therefore, it is possible to allow the user to use the software off-line and impose the charge to the user for the use of the software.

However, the method of forwarding the IC card that stored the using particulars to the SS association has problems in that whenever the amount of money stored in the balance memory of the card has been exhausted, the user has to wait for re-distribution of the card from the SS association or to buy a new IC card at the agency. In addition, the history data generally tends to be long. Accordingly, if the history data is 'stored in the IC card, it is necessary to frequently renew the card because it has merely a small memory capacity.

Therefore, a technology is required for securely saving the data, such as the charge imposing information generated by the IC card in the terminal device which should be certainly forwarded to the SS association. If the charge imposing information can be securely saved in the terminal device, frequent reissue of the IC card is unnecessary despite the small memory capacity of the card. The off-line services are available as a matter of course. The history data such as the charge imposing information is output many times. Consequently, it is necessary to maintain the order of the output pieces of the history data. The SS Association must verify the history data including the order of the pieces of the history data. If a piece of the history data is missed, the charge corresponding thereto cannot be collected.

SUMMARY OF THE INVENTION

The present invention has been made in view of the above circumstances and has an object to provide a verification data generating apparatus capable of generating data that can be saved in a terminal device without sustaining unauthorized operations and is assured to have continuity in the order of being output.

Another object of the present invention is to provide a data verification apparatus that can verify the data to be saved in a terminal device without sustaining unauthorized operations, where the continuity in the order of outputting pieces of the data is also verified.

Still another object of the present invention is to provide a storage medium storing a program to have a computer generate verification data that can be saved in a terminal device without sustaining unauthorized operations and is assured to have continuity in the order of being output.

Additional objects and advantages of the invention will be set forth in part in the description which follows and in part will be obvious from the description, or may be learned by practice of the invention.

To achieve the objects and in accordance with the purpose of the invention, as embodied and broadly described herein, a verification data generating apparatus of the present invention comprises a verification value holding element that holds a verification value and a data generating element that generates data bodies. The apparatus also comprises a verification value generating element that generates a new verification value based on both the verification value held in the verification value holding element and the data body whenever the data body is generated and updates the verification value held in the verification value holding element with the new verification value. The apparatus further comprises a data storing element that stores the data bodies generated by the data generating element in order of being generated and a verification data outputting element that generates a signature value by using the new verification value on receiving a verification data outputting request and outputs verification data including the data bodies and the signature value.

A data verification apparatus according to the present invention comprises a verification value holding element that holds a verification value and a reference verification value generating element that receives verification data that is a set of data bodies and a signature value attached thereto and generates a reference verification value based on the verification value and the set of data bodies. The apparatus also comprises an authenticating element that collates a verification value obtained from the signature value with the reference verification value and authenticates the verification data if the signature value and the reference verification value are consistent with each other. The apparatus further comprises a verification value updating element that updates the verification value with the reference verification value if the verification value obtained from the signature value and the reference verification value are consistent with each other.

BRIEF DESCRIPTION OF THE DRAWINGS

The accompanying drawings, which are incorporated in and constitute a part of this specification illustrate embodiment of the invention and, together with the description, serve to explain the objects, advantages and principles of the invention. In the drawings.

DETAILED DESCRIPTION OF THE PREFERRED EMBODIMENTS

Figure 1:
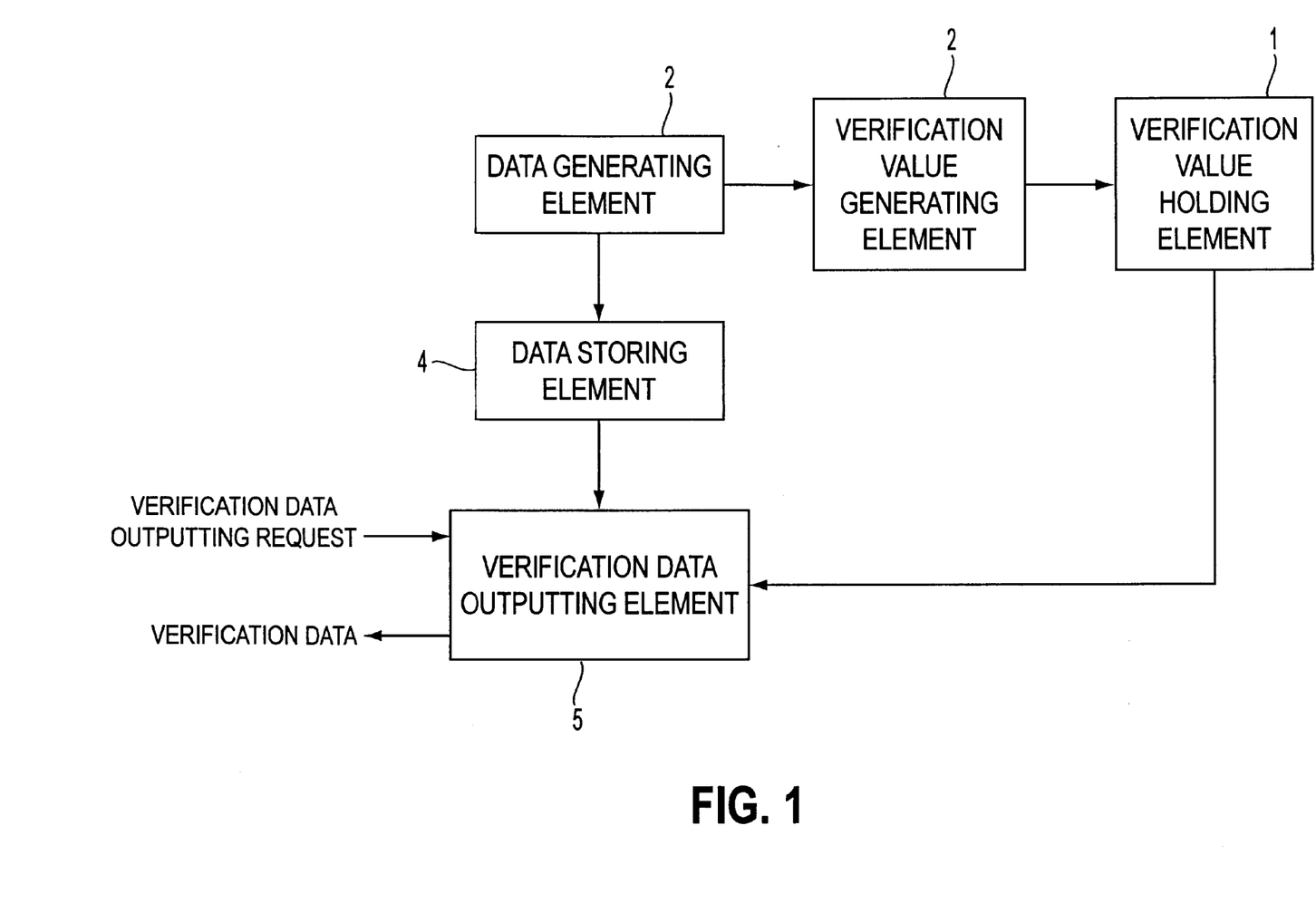
FIG. 1 shows a basic configuration of a verification data generating apparatus according to the present invention.

FIG. 1 shows a basic configuration of a verification data generating apparatus according to the present invention.

A verification value holding element 1 holds a verification value. A data generating element 2 generates a data body at a predetermined timing. For example, when a certain data processing request is received, a history of the previous data processing is generated as the data body.

Whenever the data body is generated by the data generating element 2, a verification value generating element 3 generates a new verification value based on the verification value held by the verification value holding element 1 and the newly generated data body. With the new verification value, the preceding verification value held by the verification value holding element 1 is updated. A data storing element 4 stores the data bodies generated by the data generating element 2 in order. On receiving a verification data outputting request, a verification data outputting element 5 generates a signature value based on the verification value held by the verification value holding element 1 and outputs verification data that is a combination of the generated signature value and the data body stored in the data storing element 4.

Accordingly, whenever the data processing request is executed, a new data body is stored in the data storing element 4 and the verification value held in the verification value holding element 1 is updated. When the verification data outputting request is made, verification data with a signature value generated based on the verification value in the verification value holding element 1 is output.

The verification data is thus output with the signature attached. Therefore, the content of the data body cannot be tampered with even though the data is stored in the terminal devices or the like. In addition, since the new verification values are generated using the data bodies generated in order and the verification values previously generated, the continuity in the order of the output verification data is assured. (In the case where a large number of pieces of the verification data are generated, if a piece of the verification data is missed, the data cannot be authenticated by the verification apparatus such as a server.) As a result, the verification data can be frequently output to the outside and stored in the off-line terminal device or the like. Consequently, though the memory capacity of the data storing element 4 is small, no problem occurs.

The verification data generating apparatus of the present invention can be implemented on the IC card. In this case, the history data is not forwarded with the card. The verification value is held by the IC card and the history data is read from the IC card and temporarily saved in the terminal device. The history data is then transmitted from the terminal device to the history management center through the network. Thus the off-line collection of the histories and assurance of the legitimacy of the history data are possible. The IC card capable of securely obtaining the history data or the like using a technique such as the digital signature has already been distributed as a commercial product. It is also prescribed as a secure messaging technique in ISO/IEC-7816.

A first embodiment of the verification data generating apparatus and the data verification apparatus according to the present invention is described with an example where information such as the history data is read from the IC card and saved in a terminal device and then charge imposing information is transmitted to the history management center at an arbitrary timing.

First Embodiment

Figure 2:
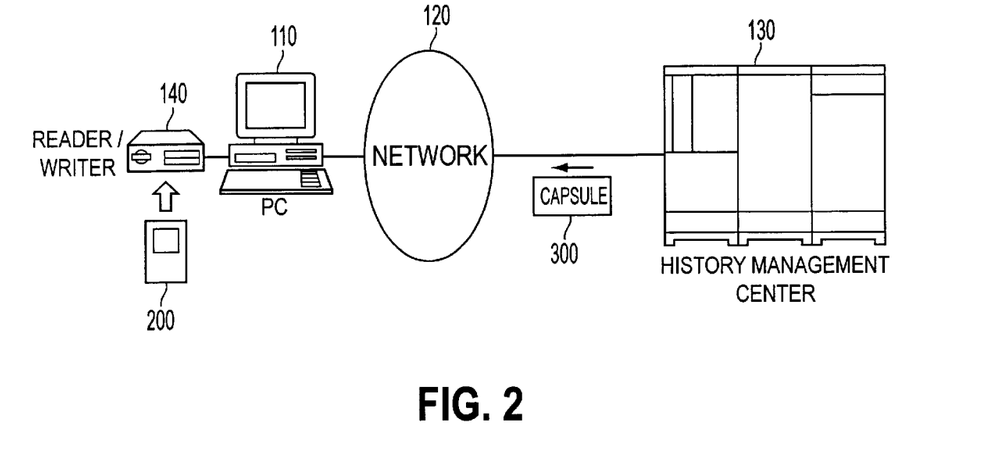
FIG. 2 shows a schematic configuration of a history management system using an IC card.

FIG. 2 shows a schematic configuration of a history management system using the IC card. A personal computer (PC) 110 of a user is connected to a history management center 130 through a network 120 such as the Internet. The history management center 130 performs the user registration and management of user data, histories of services offered to the users or the like. The history management center 130 also provides encapsulated software (hereinafter, referred to as "capsule") 300 at the request of the PC 110. Here, encapsulation means the encryption of the software with an encryption algorithm, for example, Data Encryption Standard (DES), such that the software cannot be used without decryption. It is possible to offer the capsule 300 to the users by a medium such as a CD-ROM.

A reader/writer 140 is connected to the PC 110 with an interface such as an RS-232C (a data communication interface prescribed by the Electronic Industries Association). The user connects an IC card 200 to the reader/writer 140 to obtain a decryption key for the capsule 300 or the using history provided by the history management center 130.

Figure 3:
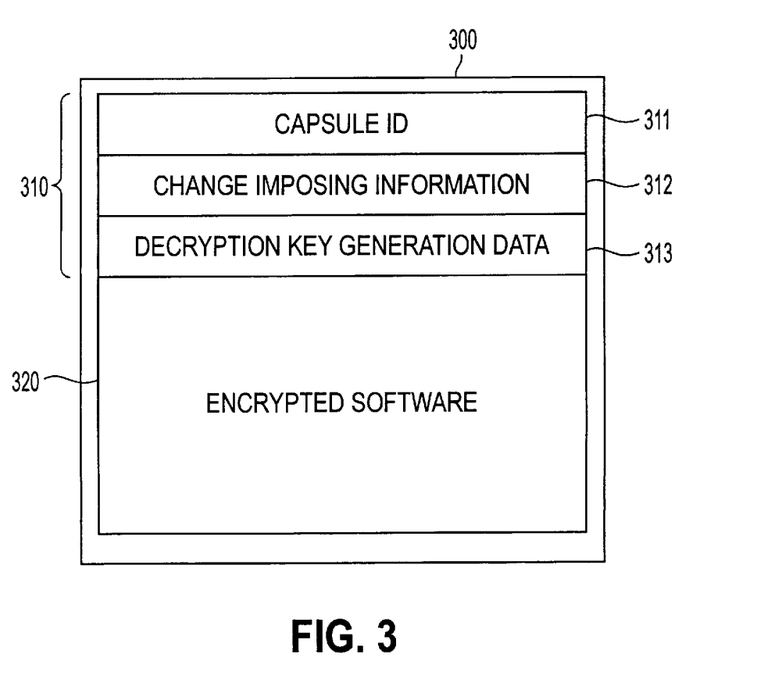
FIG. 3 shows a configuration of an encapsulated software.

The IC card 200 is given to the user by a provider who offers the software or the history management center 130 at the request of the provider. In this example, the user obtains the services through the PC 110. However, a local terminal device for utilizing the services is not limited to a PC. For example, a workstation, a server, an Automatic Teller Machine (ATM) and so forth may also be used, FIG. 3 shows a configuration of the encapsulated software. The content of the capsule 300 consists of a header 310 and the encrypted software 320. The header 310 includes a capsule ID 311 for identifying the capsule, charge imposing information 312 used for calculating the charge for using and decryption key generation data 313 for generating the decryption key for the software. Software created by a provider is encapsulated by the history management center or similar facilities.

Figure 4:
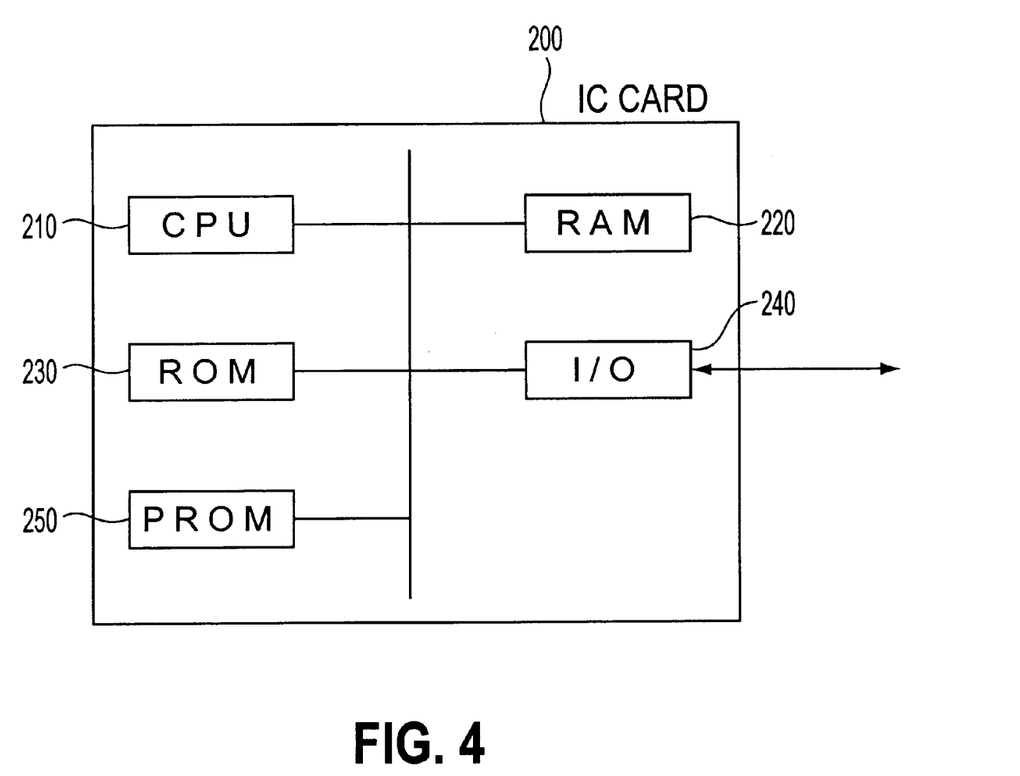
FIG. 4 shows a hardware configuration of the IC card.

FIG. 4 shows a hardware configuration of the IC card. The IC card 200 is a computer system including a CPU 210. Other elements are connected to the CPU 210 through an internal system bus. A Random Access Memory (RAM) 220 temporarily stores data to be processed by the CPU 210. A Read Only Memory (ROM) 230 stores a program that makes the CPU 210 execute functions necessary to the IC card 200. An input/output terminal device (I/O) 240 performs data communication with the reader/writer 140 in accordance with a predetermined standard. A Programmable Read Only Memory (PROM) 250 stores secret information necessary for generating the decryption key from the decryption key generation data 313 that has been encrypted, and so forth. The PROM 250 can be replaced with another storage device as long as the data can be overwritten and the data can be saved even when a power source is turned off (namely, nonvolatile memory).

Figure 5:
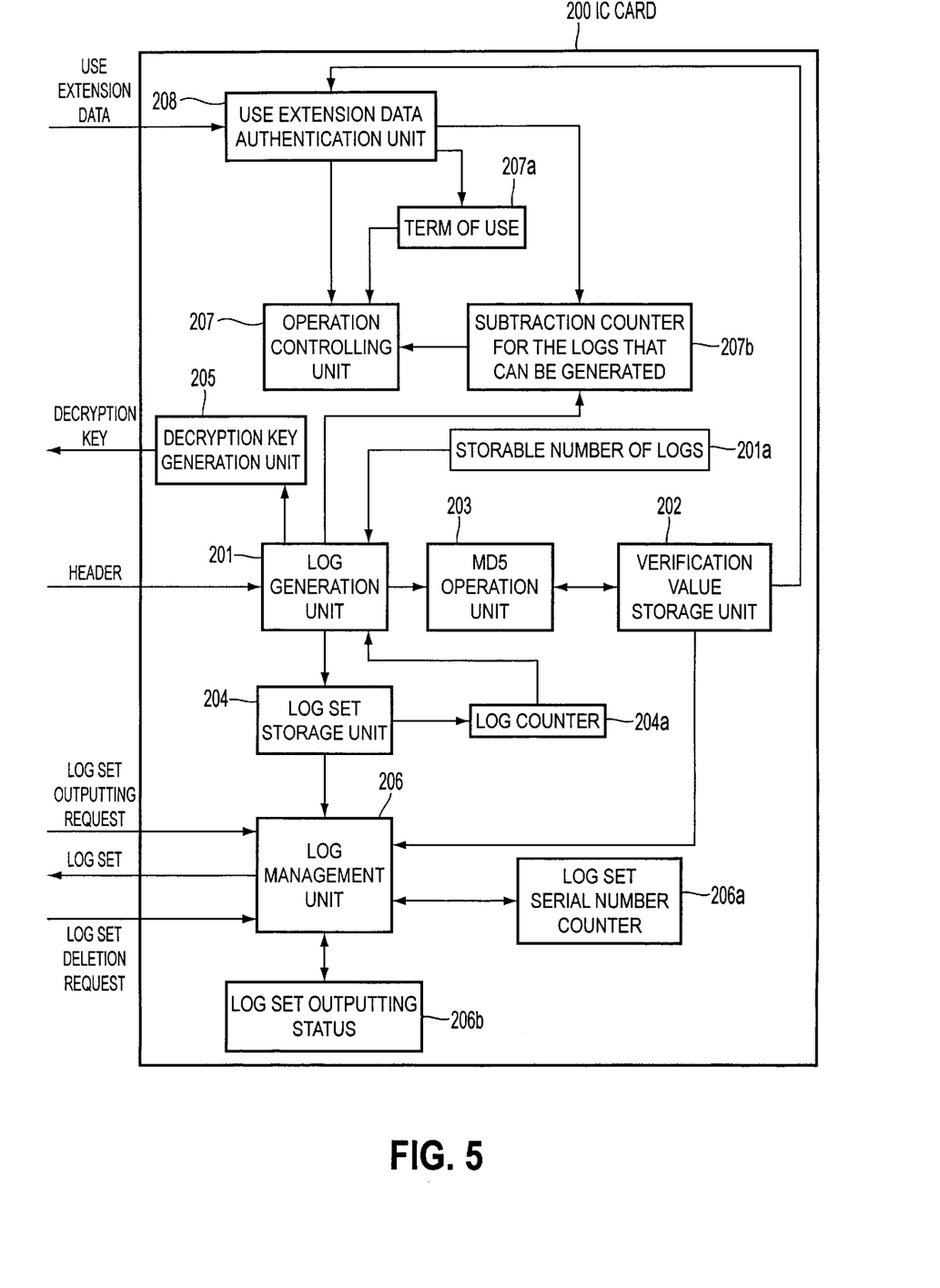
FIG. 5 is a block diagram showing processing functions of the IC card.

FIG. 5 is a functional block diagram showing processing functions of the IC card.

A log generation unit 201 receives the header from the PC 110 and generates a log. If a value of a log counter 204a is the same as that of a storable number of logs 201a, the log generation unit 201 returns an error status to the PC 110 instead of generating the log. The storable number of logs 201a is a number of logs which can be stored in a log set storage unit 204. The number is predetermined corresponding to the capacity of the PROM 250 of the IC card 200.

A verification value storage unit 202 stores a verification value to be used in verification of the continuity of the order of logs by the IC card 200 and the history management center 130. The verification method will be described later.

Whenever a new log is generated by the log generation unit 201, an MD5 operation unit 203 generates a new verification value. Specifically, at first, the log generated by the log generation unit 201 is combined with the verification value stored in the verification value storage unit 202. A message digest is then calculated based on the combined value using a one-way hash function "MD5" (see "The MD5 Message-Digest Algorithm, R. Rivest, Internet RFC 1321 (1992)) to generate the verification value. With the newly generated verification value, the verification value in the verification value storage unit 202 can be updated.

In this example, the verification value is generated by using the one-way hash function "MD5". Here, "one-way" characteristic means that the value before calculation cannot be obtained from the calculation result by the inverse operation. "MD5" can be replaced with a function that has or is considered to have the above-mentioned one-way characteristic.

The log set storage unit 204 stores a log set which is a set of plural logs and concatenates the logs generated by the log generation unit 201 to the log set one after another.

The log counter 204a counts the number of logs stored in the log set storage unit 204. The value of the counter is reset to zero when the log set in the log set storage unit 204 is deleted.

When the log is generated by the log generation unit 201, a decryption key generation unit 205 generates the decryption key based on the secret information data in the IC card 200 and the decryption key generation data 313 in the capsule 300 and forwards it to the PC 110.

On receiving a log set outputting request from the PC 110, a log management unit 206 outputs the log set stored in the log set storage unit 204 to the PC 110. At this time, a value of a log set serial number counter 206a is attached to the output log set. The log set serial number counter 206a stores the serial number of the log set. Every time the log set is deleted, the log set serial number counter 206a increments its value by one. Whether the deletion of the log set is possible is managed based on a log set outputting status 206b. When the log set outputting status 206b is "FALSE", the log set cannot be deleted. When the log set outputting status 206b is "TRUE", it is possible to delete the log set.

An operation controlling unit 207 controls activating and suspending of the basic functions of the IC card 200. More specifically, when the current time exceeds the range of a term of use 207a or a value of a subtraction counter for the logs that can be generated 207b is zero, the functions of the IC card 200 are suspended. The suspended functions are activated again in accordance with an instruction of a use extension data authentication unit 208. The term of the use of the IC card 200 is set in the term of use 207a. In the subtraction counter for the logs that can be generated 207b, a limit of the number of times of use of the capsule before the forwarding of the log set to the history management center 130 is set as an initial value. Every time the log is generated by the log generation unit 201, a decrement of the value of the subtraction counter 207b is performed by one.

The use extension data authentication unit 208 receives the use extension data from the PC 110 and authenticates it. If the authentication is succeeded, the use extension data authentication unit 208 updates the values of the term of use 207a and the subtraction counter for the logs that can be generated 207b by utilizing the use extension data.

The encrypted software in the capsule 300 is executed using the IC card having the above-described functions as follows.

The user connects the IC card 200 to the reader/writer 140 and makes the PC 110 activate the capsule 300.

Figure 6:
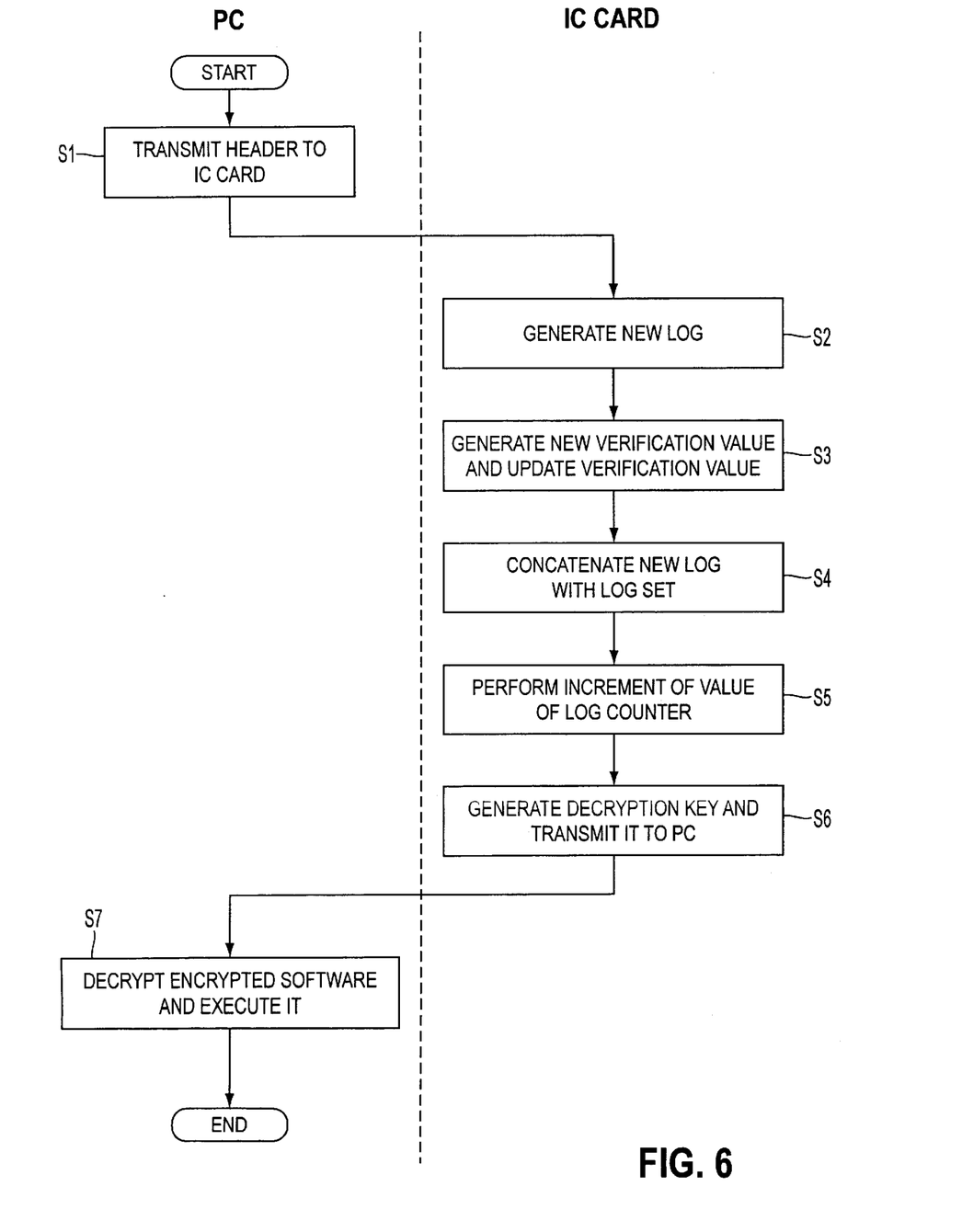
FIG. 6 is a flow chart showing procedures of starting execution of the encapsulated software.

FIG. 6 is a flow chart showing capsule execution starting procedures. The processes shown in the left side of the dotted line are performed by the PC 110 and those shown in the right side of the dotted line are performed by the IC card 200.

S1: The PC 110 transmits the header 310 in the capsule 300 to the IC card 200.

S2: After the IC card 200 receives the header 310, the log generation unit 201 generates a new log and transmits it to the MD5 operation unit 203 and the log set storage unit 204.

S3: The MD5 operation unit 203 generates a new verification value based on the received log and the verification value previously stored in the verification value storage unit 202 and updates the previous verification value in the verification value storage unit 202.

S4: The log set storage unit 204 concatenates a new log with the log set stored therein. At this time, if the log set outputting status 206b is "TRUE", the log management unit 206 changes it into "FALSE".

S5: An increment of the value of the log counter 204a is performed by one. A decrement of the value of the subtraction counter for the logs that can be generated 207b is performed by one.

S6: The decryption key generation unit 205 generates the decryption key by utilizing the decryption key generation data 313 and secret information data and forwards it to the PC 110.

S7: On receiving the decryption key, the PC 110 decrypts the encrypted software with the decryption key to execute the software.

Thus, whenever the user executes the software in the capsule, the using history is saved as a log in the IC card 200.

Figure 7:
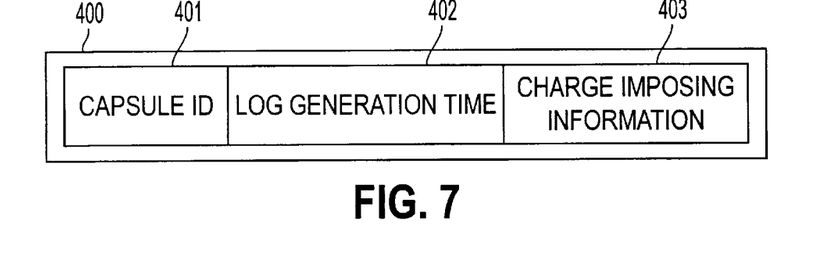
FIG. 7 shows an example of a log configuration.

FIG. 7 shows a configuration of the log. The log 400 includes a capsule ID 401, a log generation time 402 and charge imposing information 403. Since the log 400 is temporarily stored in the IC card 200, the small number of bytes constituting each element is preferable. Here, it is assumed that the system time is represented by four bytes corresponding to the Coordinated Universal Time (UTC). It is unnecessary to include all UTC four bytes in the log generation time. For example, if a detailed value is not required, it may be sufficient to include the upper three bytes in the log generation time. If only a relative value is required, the lower three bytes may be included.

Then a method of collecting and verifying the log set saved in the IC card 200 by the history management center 130 is described as follows. The plural logs in the log set storage unit 204 are concatenated in order of generation and stored as a log set in the nonvolatile memory (PROM 250) in the IC card 200. However, it is impossible to store a large amount of log data in the IC card 200 because the memory capacity of the IC card 200 is not very large. Therefore, the storable number of logs 201a is set in the IC card 200 in advance. When the value of the log counter 204a reaches the value of the storable number of the logs 201a, the log generation unit 201 cannot generate a new log and the decryption key generation unit 205 does not output a decryption key. Accordingly, it is impossible to execute the software.

In this condition, the user operates the PC 110 so that the PC 110 makes a log set outputting request to the IC card 200. On receiving the log set outputting request, the IC card 200 attaches its signature to a log set and outputs the log set with the signature. The output of the log is also available before the value of the log counter 204a reaches the storable number of logs 201a.

Figure 8:
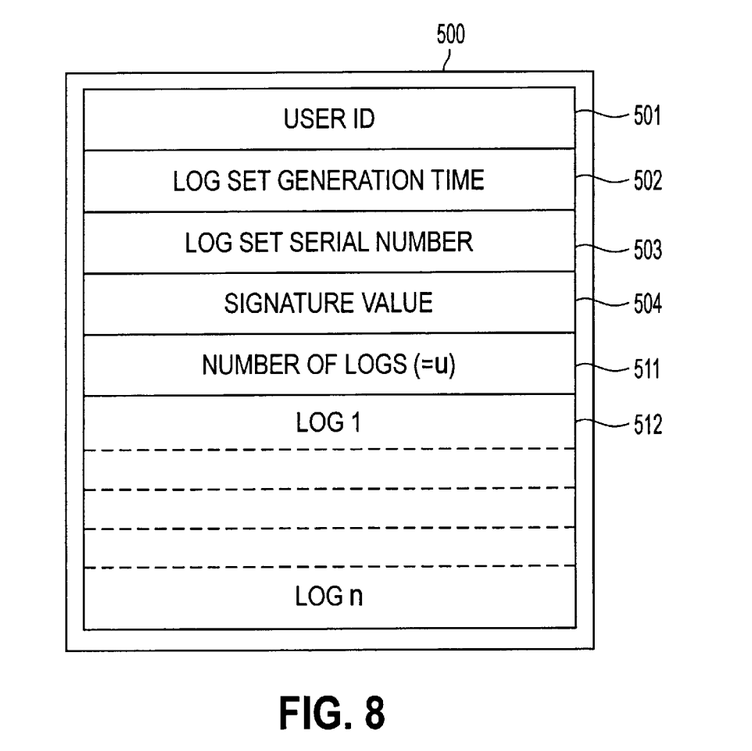
FIG. 8 shows a configuration of a log set with a signature.

FIG. 8 shows a configuration of a log set with a signature. The log set with a signature 500 includes a user ID 501, a log set generation time 502, a log set serial number 503, a signature value 504, a number of logs 511 and logs (to the number of n) 512.

Figure 9:
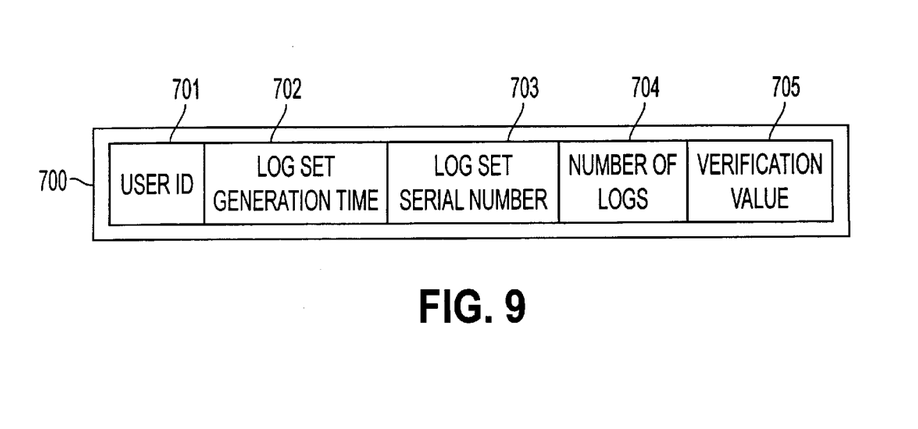
FIG. 9 shows an example of configuration of a plain text attached as a signature value to the log set.

FIG. 9 shows a configuration of a plain text attached as a signature value 504 to the log set. The case of encryption of a plain text 700 with a signature key (secret key) of the IC card 200 is now explained. The encryption method is not limited to a public-key cryptosystem. If the secret key can be securely shared by the history management center 130 and the IC card 200, a symmetric cryptosystem may be used.

The plain text 700 to be signed includes a user ID 701, a log set generation time 702, a log set serial number 703, a number of logs 704 and a verification value 705. The verification value 705 is the same as that stored in the verification value storage unit 202 of the IC card 200 when the log set 500 is output. The plain text 700 including these pieces of information is encrypted by the secret key of the IC card 200 to obtain the signature value 504.

Figure 10:
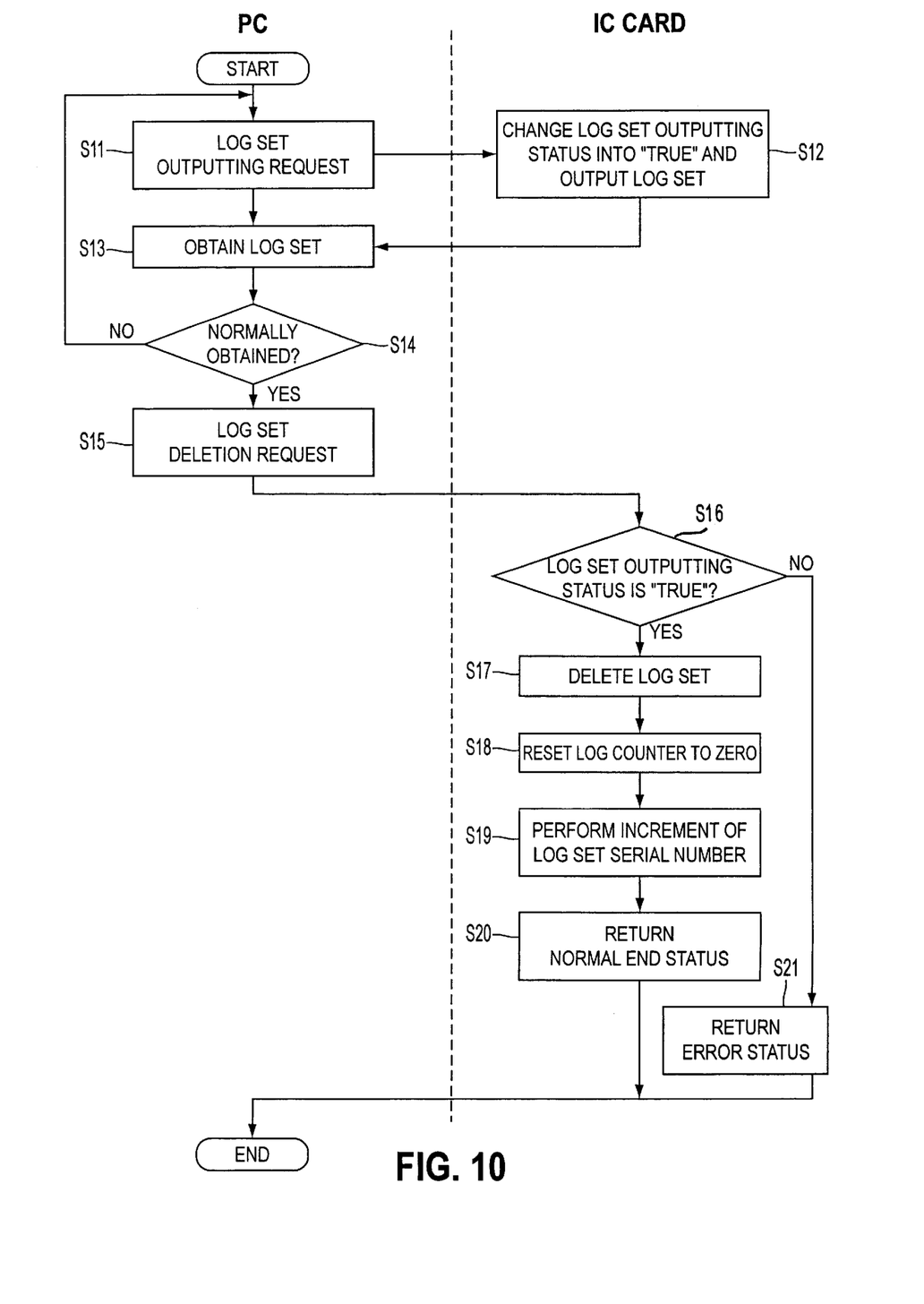
FIG. 10 is a flow chart showing procedures of outputting the log set from the IC card.

FIG. 10 is a flow chart showing procedures of outputting the log set from the IC card. The processes shown in the left side of the dotted line are performed by the PC 110 and those shown in the right side of the line are performed by the IC card.

S11: The PC 110 makes a log set outputting request to the IC card 200.

S12: In the IC card 200, the log management unit 206 receives the log set outputting request and changes the log set outputting status 206b into "TRUE". Then the log set with a signature 500 as shown in FIG. 8 is output.

S13: The PC 110 obtains the log set from the IC card 200.

S14: The PC 110 determines whether the log set is normally obtained. If the PC 110 normally obtained the log set, the process proceeds to the step S15. Otherwise, the process returns to the step S11 where the PC 110 makes the log set outputting request to the IC card 200, and the processes of the steps S11 through S15 are repeated.

S15: The PC 110 makes a log set deletion request to the IC card 200.

S16: In the IC card 200, the log set management unit 206 receives the log set deletion request and determines whether the log set outputting status 206b is "TRUE". If it is "TRUE", the process proceeds to the step S17. Otherwise, the process proceeds to the step S21.

S17: The log management unit 206 deletes the log set in the log set storage unit 204.

S18: The log counter 204a resets its value to zero.

S19: The log set serial number counter 206a performs an increment of the log set serial number held therein by one.

S20: The log management unit 206 returns a status indicating normal end to the PC 110 and then the process is completed.

S21: If the log set outputting status 206b is "FALSE", the log management unit 206 does not delete the log set and returns an error status to the PC 110.

If the IC card 200 is in a reset condition, the log set outputting status 206b becomes "FALSE" considering the case where an error is generated during the output of the log set.

In the log set output procedures, the output of the log set and the deletion of the log set are performed according to the respective instructions as described above. The reason of the separate instructions is related to the protocol format of the IC card 200 described as follows. With the data transmission protocol T=0 and/or T=1 (ISO/IEC 7816-3) of the IC card 200, the IC card 200 outputs the data to an interface device (here, indicating the PC 110) and then changes its status to a reception waiting status. Therefore, it is impossible to execute the processes in the IC card 200. If the output and deletion of the log set is to be performed in accordance with a single command, a log set must be output after another log set is deleted. In the case where the output of the log set is failed during the communication, the log set is lost.

To the contrary, suppose that two commands, the log set output command and the log set deletion command, are merely prepared. If the user issues the log set deletion command to the IC card before the output of the log set by mistake, the log set is lost. Therefore, in the present invention, the IC card has the log set outputting status 206b. Only when the log set 203 is output, the log set outputting status 206b becomes "TRUE" and the log set can be deleted. If the software is activated after the output of the log set, a new log is generated in the IC card 200 and the log set outputting status 206b becomes "FALSE". Accordingly, the log set cannot be deleted until the log set is output.

The log set 500 output from the IC card 200 is temporarily stored in the PC 110. The history management center 130 collects the log set 500 stored in the PC 110 at predetermined intervals. Based on the content of the collected logs, the history management center 130 collects the charges from the users to distribute the charges to the author of the software. For efficiently collecting the histories (logs), the term of use 207a and a number of logs that can be generated are set in the IC card 200 in advance. The term of use 207a represents the date when the validity of the card expires. After the term of use 207a, the use of the IC card 200 is suspended and the capsule 300 cannot be utilized. To use the IC card 200 and the capsule 300 again, it is necessary to transmit the log set output so far to the history management center 130 and obtain the use extension data. The number of logs that can be generated, namely, the number of times capable of using the capsule 300 before transmitting the log set to the history management center 130 is set as an initial value of the subtraction counter for the logs that can be generated 207b. When the value of the counter 207b becomes zero, the status of the IC card 200 is changed to the suspended status. Therefore the capsule 300 cannot be used. To use the IC card 200 and the capsule 300 again, the log set must be forwarded to the history management center 130 to obtain the use extension data.

For verification of the log set forwarded by each user is performed in the history management center, the center is required to have the user database as described below.

Figure 11:
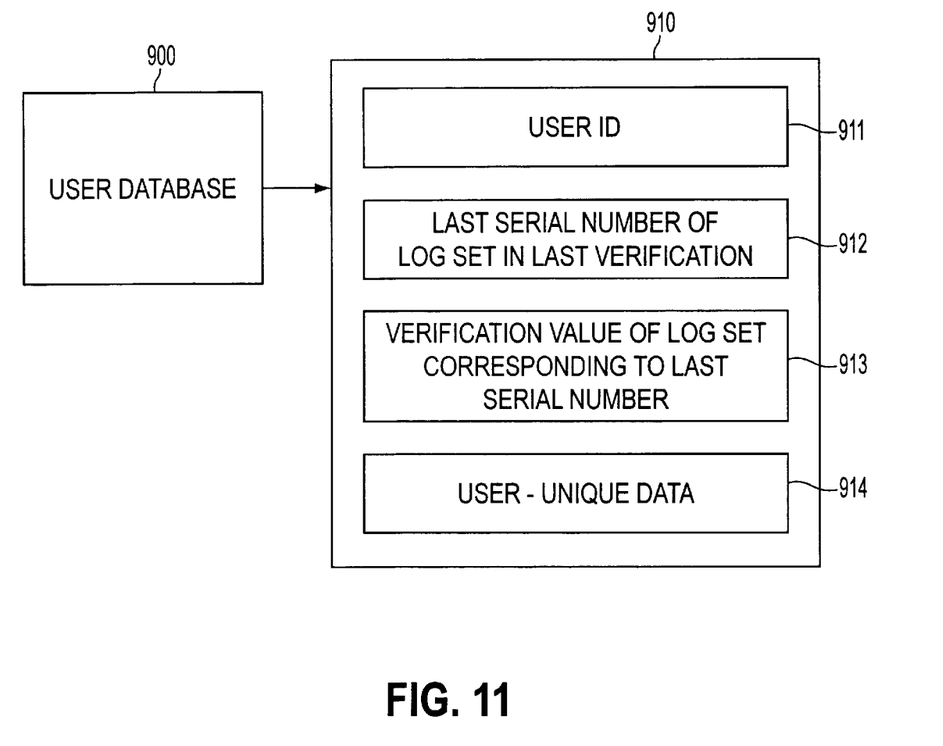
FIG. 11 shows an example of a user database managed by a history management center.

FIG. 11 shows an example of a user database managed by the history management center. The user database 900 stores history management data 910 for each user. The history management data 910 includes a user ID 911, a last serial number 912 of a log set in the last verification, a verification value 913 of the log set corresponding to the serial number 912 and user-unique data 914 used for authentication or the like.

When the capsule becomes unavailable because the term of use expires, or in an earlier arbitrary timing, the user forwards all of the log sets output from the IC card 200 to the history management center 130. It is preferred that the user transmits the log sets output from the IC card 200 in order of the log set serial numbers. This is unnecessary if the history management center 130 can sort the log set serial numbers. However, the complete output log sets without lacking are required.

Figure 12:
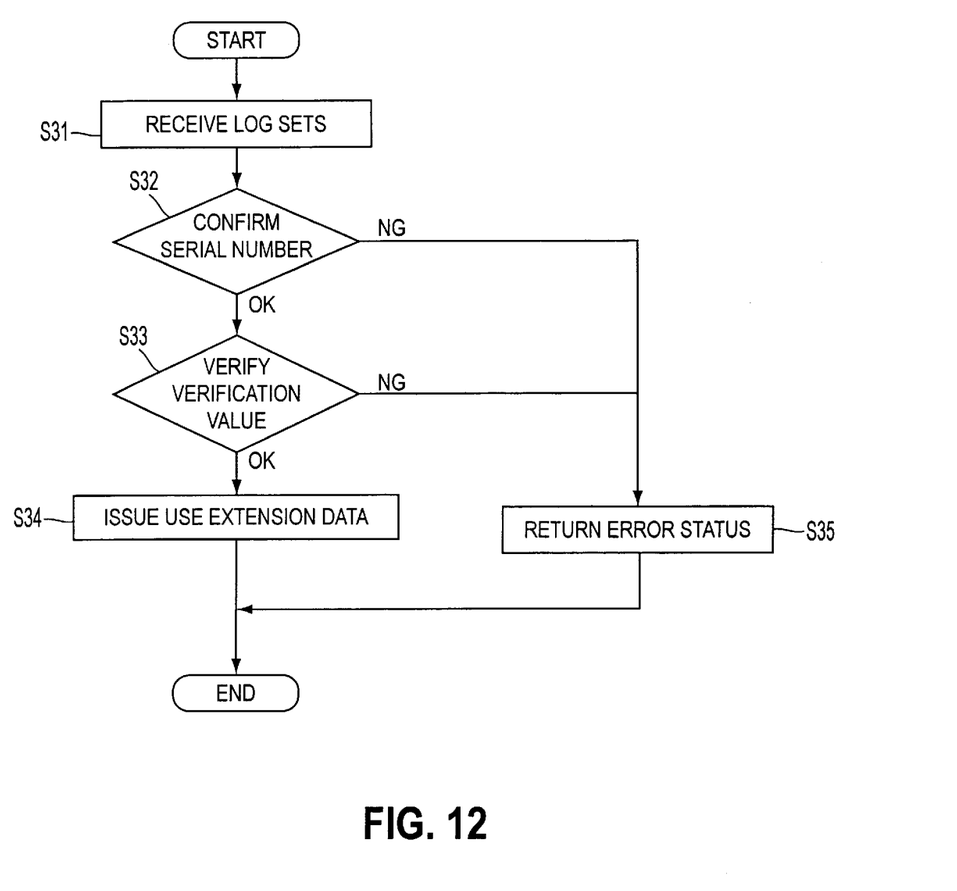
FIG. 12 is a flow chart showing procedures of verification of the log set in the history management center.

FIG. 12 is a flow chart showing procedures of verification of the log sets in the history management center. All processes are executed by a computer of the history management center 130.

S31: The log sets are received.

S32: The received log sets are sorted in order of the serial numbers. In addition, corresponding history management data 910 is obtained from the user database 900 based on the user ID. It is confirmed that the minimum value of the serial numbers of the log sets received this time succeeds to the log set serial number 912 of the user verified immediately before. Then the continuity of the serial numbers of the log sets received this time is confirmed. If no log set is missed, the process proceeds to the step S33. Otherwise, the process proceeds to the step S35.

S33: The continuity of the logs is verified by using the verification value 705 stored in the signature of the log set. If the verification is correctly performed, the process proceeds to the step S34. Otherwise, the process proceeds to the step S35. The details of the verification procedures are described later.

S34: The use extension data is issued and forwarded to the PC 110.

S35: An error status is returned to the PC 110.

In this way, the user can obtain the use extension data.

Figure 13:
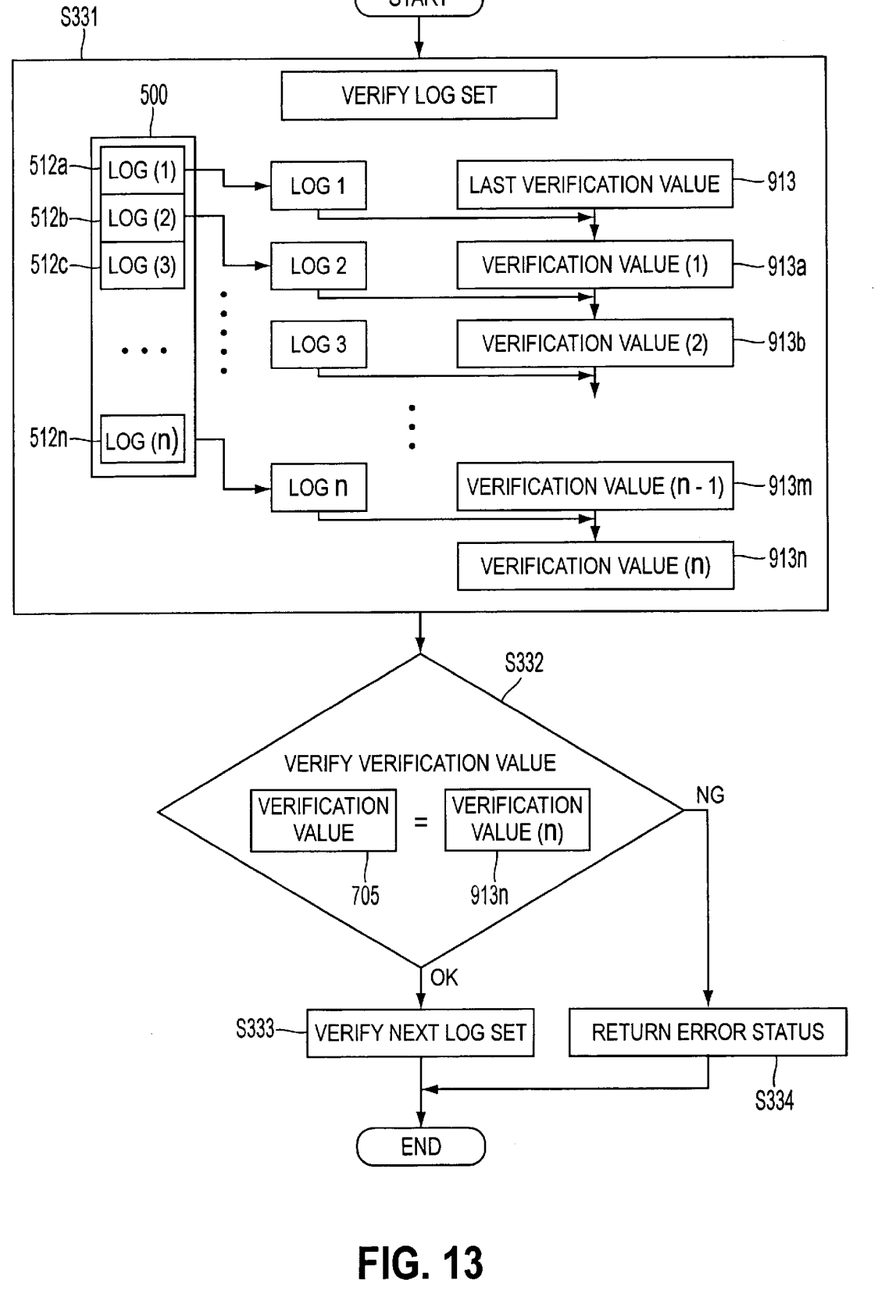
FIG. 13 shows details of procedures of verification of a verification value.

FIG. 13 shows procedures of verifying of the verification value. The following processes are executed by the computer of the history management center 130.

S331: The log set is verified. For the verification, plural logs 512a through 512n and the signature value 504 in the log set 500 are used. If plural log sets exist, the verification is performed in order of the serial numbers.

At first, the legitimacy of the log set is verified. Specifically, the signature value 504 in the log set 500 is verified with the public key of the IC card 200 corresponding to the user ID 501. Thus the conformity between the user ID 501 in the log set 500 and the user ID 701 in the plain text 700 of the signature value is confirmed.

Then the first log 512a is concatenated with the preceding verification value 913 and a new verification value is generated in the same way as the IC card 200 generates the verification value. That is, a message digest is calculated for the concatenated value using the one-way hash function MD5 to generate the new verification value 913a.

Next the log 512b is concatenated with the verification value 913a to generate a new verification value 913b. The same operation is performed on the logs 512c through 512n. As a result, a verification value 913n that is a message digest for the concatenated value of the log 512n and the verification value 913m is generated.

S332: The verification values 705 and 913n are compared. If the values are consistent with each other, the process proceeds to the step S333. Otherwise, the process proceeds to the step S334.

S333: If the next log set exists, the verification value is verified in the same way as the above procedures. If the next log set does not exist, that is, the verification of all log sets received by the user is completed, the last serial number 912 of the preceding verification in the history management data of the user managed by the history management center is updated with the serial number of the last log set verified this time. In addition, the last verification value 913 of the preceding verification is updated with the verification value of the last log set verified this time.

S334: An error status is returned to the user and the process is completed.

In this way, the history management center 130 verifies the log set and issues the use extension data.

Figure 14:
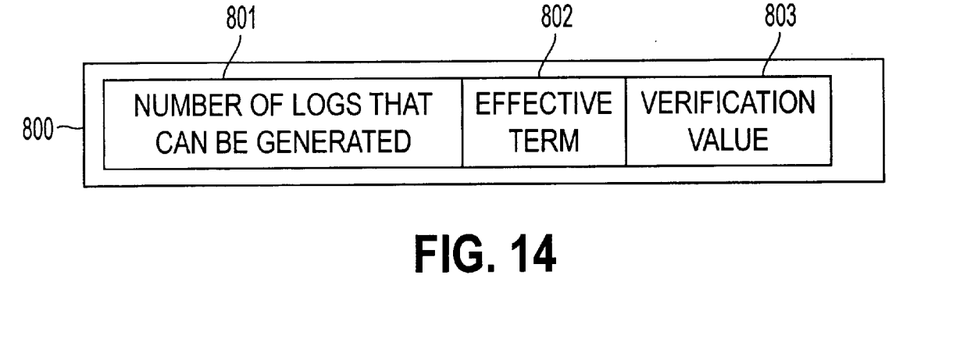
FIG. 14 shows an example of configuration of use extension data.

FIG. 14 shows an example of a configuration of the use extension data. Specifically, the figure shows a plain text 800 of the use extension data before the signature is attached. The plain text 800 includes a number of logs that can be generated 801, an effective term 802 and a verification value 803. Here, the verification value 803 is the verification value of the log set verified at last. The history management center 130 attaches a signature to the plain text 800 by using the secret key and forwards it as the use extension data to the user.

The user inputs the received use extension data to the IC card 200. In the IC card 200, the use extension data authentication unit 208 verifies the signature of the use extension data with the public key registered in advance at the history management center 130. If the verification value 803 in the use extension data and the verification value in the verification value storage unit 202 are consistent with each other, the term of use 207a of the IC card 200 is updated with the effective term 802 in the use extension data. In addition, the value of the subtraction counter for the logs that can be generated 207b is updated with the number of logs that can be generated 801 described in the use extension data. If the IC card 200 is in the suspended status, the operation controlling unit 207 cancels the suspended status.

In the above description, the case where the log set can be collected is taken as the example. However, though a part of the log set is destroyed from an accident, the verification of the log set except the destroyed part is possible according to the present invention because the log sets are managed based on the log serial numbers and signature of the IC card is attached to each log set.

Second Embodiment

In a second embodiment, the capsule 300 can be used during the period from the output of the log set to the reception of the use extension data. In the first embodiment, if the capsule 300 is executed between the transmission of the log set 500 to the history management center 130 and the reception of the use extension data, a new log is generated in the IC card 200 and the verification value is updated. Therefore, the use extension data cannot be verified. To prevent this problem, it is considered that the use of the capsule is prohibited during the period from the transmission of the log set from the user to the history management center 130 to the reception of the use extension data. However, even though the network is utilized, the capsule 300 is unavailable for some time. This causes inconvenience to the user. Accordingly, the second embodiment allows the capsule 300 to be used if the log can be stored in the IC card even after the user forwards the log set to the history management center 130.

The second embodiment is the same as the first embodiment except the processing function of the use extension data authentication unit 208. Therefore, the second embodiment is described utilizing the reference numbers assigned to the elements of the first embodiment.

Figure 15:
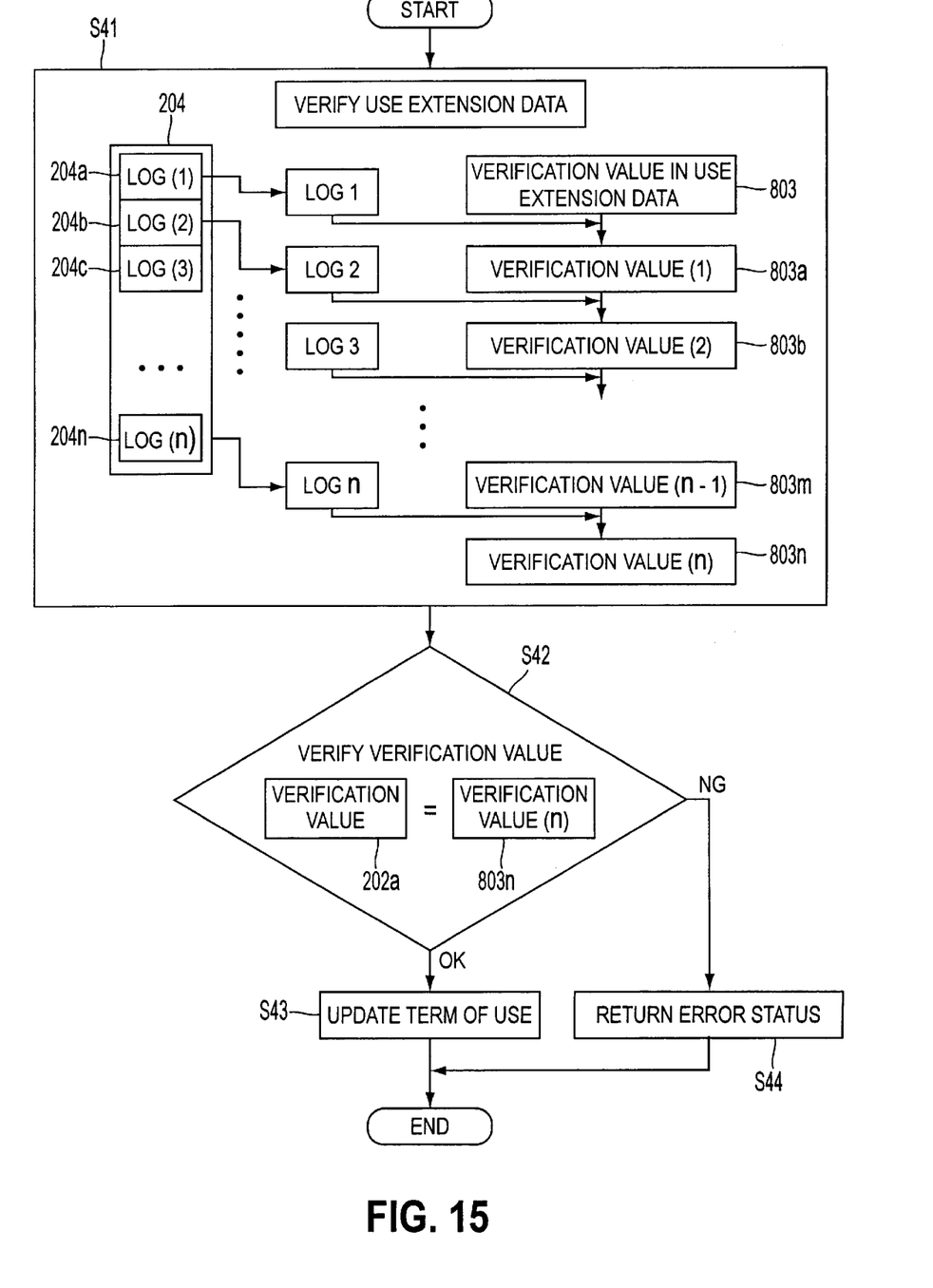
FIG. 15 shows an authentication process for the use extension data in a second embodiment.

FIG. 15 shows the process of authentication of the use extension data in the second embodiment. Suppose a case where the user forwards the log sets output so far to the history management center 130 and after that the user utilizes the capsule for the n times. As shown in the figure, logs to the number of n 204a through 204n are stored in the log set storage unit 204. With this condition, the user receives the use extension data 800 from the history management center 130 and inputs it to the IC card 200. Then the following processes are executed.

S41: In the IC card 200, the use extension data authentication unit 208 verifies the signature of the use extension data with the public key of the history management center 130 to obtain a verification value 803 in the use extension data. The first log 204a in the log set storage unit 204 is then concatenated with the verification value 803 in the use extension data and a verification value 803a is generated in the same way as the MD5 operation unit 203 generates the verification value. Similarly, the new verification values are generated based on the logs 204b though 204n in order and the generated verification values 803a through 803m and finally a verification value 803n is generated.

S42: The use extension data authentication unit 208 compares the verification value 202a in the verification value storage unit 202 with the verification value 803n. If the values are consistent with each other, the process proceeds to the step S43. Otherwise, the process proceeds to the step S44.

S43: The use extension data authentication unit 208 updates the term of use 207a of the IC card 200 with the effective term 802 in the use extension data. In addition, the value of the subtraction counter for the logs that can be generated 207b is updated with the value obtained by subtracting the value of the log counter 204a (=n) from the number of logs that can be generated 801 in the use extension data. If the IC card 200 is in the suspended status, the operation controlling unit 207 cancels the suspended status.

S44: If the verification values 202a and 803n are not consistent with each other, the use extension data authentication unit 208 interrupts the process and returns an error status.

In this embodiment, the verification value in the use extension data is verified in the IC card by the verifying of the verification value stored in the log set. However, the verification method is not limited thereto. It may be considered that the verification value of the log set output last time is stored as a second verification value separate from the verification value stored in the verification value storage unit 202 and the verification value in the use extension data is compared with the second verification data to be verified.

The functions of the IC card are realized by the CPU therein by executing a program stored in the ROM. The program can be stored in a storage medium readable by other computers. As such a storage medium, a magnetic storage device, a semiconductor memory or the like may be used. For the distribution in the market, the program can be stored in the portable storage medium such as a CD-ROM or a floppy diskette, or stored in the storage medium of the computer connected to the network and transferred to other computers. For executing the program by the computer, the program is stored in the hard disk device or the like in the computer and then loaded into the main memory.

What is claimed is:

1. A verification data generating apparatus comprising:
   a verification value holding element that holds a verification value;
   a data generating element that upon a use of a software program generates one of a plurality of data bodies, each one of the plurality of data bodies being a log of the use of the software program;
   a verification value generating element that generates a new verification value based on both the verification value held in the verification value holding element and the one of the plurality of data bodies whenever the one of the plurality of data bodies is generated and updates the verification value held in the verification value holding element with the new verification value;
   a data storing element that stores a set of data bodies to form a history of the use of the software program, the set of data bodies being a list of the plurality of data bodies in order of generation;
   a verification data outputting element that generates a signature value by using the new verification value on receiving a verification data outputting request and outputs verification data including the set of data bodies and the signature value.

2. The verification data generating apparatus as set forth in claim 1, further comprising:
   a data deletion element that deletes the plurality of data bodies from the data storing element in reply to a data deletion request; and
   a counter that counts a verification data serial number and performs an increment of the verification data serial number whenever the plurality of data bodies is deleted by the data deletion element,
   wherein the verification data outputting element outputs the verification data with a value of the counter at the time when the verification data outputting request is received.

3. The verification data generating apparatus as set forth in claim 1, wherein the verification value generating element generates the new verification value by using a one-way function.

4. The verification data generating apparatus as set forth in claim 1, further comprising:
   a data generating condition holding element that holds a condition for generating the plurality of data body;
   a function suspending element that suspends a function of the data generating element when the condition is unsatisfied;
   a use extension data authenticating element that authenticates use extension data when it is received; and
   a suspension canceling element that cancels the suspension of the function when the use extension data is authenticated.

5. The verification data generating apparatus as set forth in claim 4, wherein the use extension data authenticating element extracts a reference verification value from the received use extension data and authenticates the use extension data if the reference verification value and the verification value held in the verification value holding element are consistent with each other.

6. The verification data generating apparatus as set forth in claim 4, wherein the use extension data authenticating element extracts a reference verification value from the received use extension data, selects one of the plurality of data bodies in the data storing element in order of being stored, generates a new verification value based on the selected data body and the reference verification value, separately selects one of the plurality of data bodies and generates a new verification value in sequence and authenticates the use extension data if the new verification value generated at last and the verification value held in the verification value holding element are consistent with each other.

7. The verification data generating apparatus as set forth in claim 4, further comprising:
   a second verification value holding element that holds the value held in the verification value holding element as a second verification value at the time when the verification data outputting element outputs the verification data,
   wherein the use extension data authentication element extracts a reference verification value from the received use extension data and authenticates the use extension data if the reference verification value and the second verification value is consistent with each other.

8. A data verification apparatus comprising:
   a verification value holding element that holds a verification value;
   a reference verification value generating element that receives verification data that is a set of data bodies that forms a history of use of a software program and includes a list of a plurality of data bodies in order of their generation and a signature value attached thereto and generates a reference verification value based on the verification value and the set of data bodies;
   an authenticating element that collates a verification value obtained from the signature value with the reference verification value and authenticates the verification data if the signature value and the reference verification value are consistent with each other; and
   a verification value updating element that updates the verification value with the reference verification value if the verification value obtained from the signature value and the reference verification value are consistent with each other.

9. A storage medium readable by a computer, the storage medium storing a program of instructions executable by the computer to perform a function for generating verification data, the function comprising the steps of:
   holding a verification value;
   generating one of a plurality of data bodies upon a use of a software program, each one of the plurality of data bodies being a log of the use of the software program;
   generating a new verification value based on both the verification value and the one of the plurality of data bodies whenever the one of the plurality of data bodies is generated and updating the verification value with the new verification value;
   storing a set of data bodies to form a history of the use of the software program, the set of data bodies being a list of each of the plurality of data bodies in order of generation; and
   generating a signature value by using the verification value on receiving a verification data outputting request and outputting verification data including the set of data bodies and the signature value.

* * * * *